US008065214B2

(12) United States Patent
Keyes et al.

(10) Patent No.: US 8,065,214 B2
(45) Date of Patent: Nov. 22, 2011

(54) METHODS AND SYSTEM FOR ASSESSING LOSS SEVERITY FOR COMMERCIAL LOANS

(75) Inventors: Tim Kerry Keyes, West Redding, CT (US); Mary Kennedy Cole, New York City, NY (US); Sundeep Ruia, Norwalk, CT (US)

(73) Assignee: GE Corporate Financial Services, Inc., Norwalk, CT (US)

( * ) Notice: Subject to any disclaimer, the term of this patent is extended or adjusted under 35 U.S.C. 154(b) by 979 days.

(21) Appl. No.: 11/220,011

(22) Filed: Sep. 6, 2005

(65) Prior Publication Data
US 2007/0055595 A1 Mar. 8, 2007

(51) Int. Cl.
*G06Q 40/00* (2006.01)
(52) U.S. Cl. .......................... 705/36 R; 705/35
(58) Field of Classification Search ............... 705/35–45
See application file for complete search history.

(56) References Cited

U.S. PATENT DOCUMENTS

| | | | | |
|---|---|---|---|---|
| 6,078,903 A * | 6/2000 | Kealhofer | .................... | 705/36 R |
| 6,112,190 A | 8/2000 | Fletcher et al. | | |
| 6,249,775 B1 * | 6/2001 | Freeman et al. | ............. | 705/36 R |
| 2001/0029477 A1 * | 10/2001 | Freeman et al. | ................. | 705/36 |
| 2002/0019804 A1 | 2/2002 | Sutton | | |
| 2003/0101132 A1 | 5/2003 | Gaubatz et al. | | |
| 2003/0126071 A1 * | 7/2003 | Keyes et al. | .................... | 705/38 |
| 2004/0030667 A1 * | 2/2004 | Xu et al. | ............................ | 707/1 |
| 2004/0153330 A1 | 8/2004 | Miller et al. | | |
| 2005/0262013 A1 * | 11/2005 | Guthner et al. | ................. | 705/38 |

OTHER PUBLICATIONS

Sample Selection Bias in Credit Scoring Models Author(s): J. Banasik, J. Crook, L. Thomas Source: The Journal of the Operational Research Society, vol. 54, No. 8, (Aug. 2003), pp. 822-832 Published by: Palgrave Macmillan Journals on behalf of the Operational Research Society Stable URL: http://www.jstor.org/stable/4101652.*
Bank-Loan Loss Given Default, Gerg M. Gupton, Daniel Gates, Lea V. Carty, Moody's Investor Service, Global Credit Research, Nov. 2000.*
The new talk of the town: CreditMetrics, a credit value-at-risk approach. Gupton, Greg M. Journal of Lending & Credit Risk Management , v79 , n12 , p. 44(11) Aug. 1997 ISSN: 0021-986X Language: English.* International Banking and Finance, JA Kelly, I Lustgarten, International Lawyer, 2000, vol. 34, part 2, pp. 429-452.*
Stephen McCrory. (2005). Capital Adequacy: Is Your Company Prepared for Basel II Implementation? The Journal of Equipment Lease Financing, 23(1), C1-C5. Retrieved Sep. 12, 2011, from Accounting & Tax Periodicals.*

* cited by examiner

*Primary Examiner* — Alexander Kalinowski
*Assistant Examiner* — Abhishek Vyas
(74) *Attorney, Agent, or Firm* — Armstrong Teasdale LLP

(57) ABSTRACT

A method for predicting expected and unexpected loss outcomes for a portfolio of loans is provided. The loans are issued by a lender to a plurality of borrowers. The method includes recording key account and risk attributes for a historical portfolio of loans, recording actual default and loss information for each borrower included within the historical portfolio of loans, and comparing the key account and risk attributes with the actual default and loss information over a period of time. The method also includes selecting a sample of loans from the historical portfolio of loans to determine loss drivers based on the comparison of the key account and risk attributes with the actual default and loss information, building a regression tree based model representing relationships between the loss drivers, and expected and unexpected loss outcomes for the historical portfolio of loans, and predicting the expected and unexpected loss outcomes for a second portfolio of loans using the regression tree based model and the loss drivers for the second portfolio of loans.

30 Claims, 6 Drawing Sheets

Legend
EL = Expected (Average) Loss Given Default
UL = Unexpected (Standard Deviation) Loss Given Default
Modeling Criteria = Hold-out Sample

Sample Computation:

1. Probability of Default (Obligor Rating) => is derived to indicate a default frequency.

× 2. Loss Given Default => Expected Specific Reserve Impact, as a Percentage of Defaulted Outstanding Balance = 3. Expected Loss % (EL%) = PD × LGD

METHODS AND SYSTEM FOR ASSESSING LOSS SEVERITY FOR COMMERCIAL LOANS

BACKGROUND OF THE INVENTION

This invention relates generally to assessing loss severity for commercial loans and, more particularly, to network-based methods and systems for assessing expected and unexpected loss outcomes for commercial loans.

Commercial lenders generally engage in the business of issuing loans to borrowers, such as other business entities. Borrowers of commercial loans typically use the loans for financing or expanding their business operations. The ability of the borrowers to pay back the loans may often depend on the profitability of the borrowers' business.

Commercial lenders typically have a portfolio of loans which may include numerous loans made to a plurality of different borrowers. Because many commercial lenders are engaged in the business of loaning money, these commercial lenders continuously monitor and manage their portfolios in an effort to enhance the financial profits of their respective companies. In managing these loan portfolios, at least some commercial lenders will quantify risks associated with each loan and assess potential losses that may result from each loan. For example, a commercial lender may review a loan within its portfolio in an attempt to quantify the risk associated with the borrower defaulting on the loan. The commercial lender may also attempt to assess the potential loss from such a default.

Losses, and the predictability of losses, may impact how a commercial lender may provide financing in the future, namely whether the lender is able to provide financing from its own equity capital (i.e., equity) or from borrowing in the market (i.e., debt). In the commercial lending industry, the allocation of equity versus debt is at least sometimes a function of how well the lender understands the uncertainties associated with losses in their business.

The risk associated with each loan and the predictability of losses may also influence whether a lender will make a profit, or a certain amount profit, on each account. Moreover, in at least some cases, a commercial lender may attempt to predict losses because the amount of debt used for financing by such a lender may be directly related to the predictability of losses (e.g., the more predictable, the more the lender can finance from debt). In addition, a commercial lender may attempt to predict losses so that it can establish reserves to cover such losses. Consequently, the more accurately a commercial lender is able to predict losses, then the more accurately it can establish reserves and provide additional financing to borrowers. Accordingly, the ability to accurately predict losses by a commercial lender better enables that commercial lender to be a more profitable business.

BRIEF DESCRIPTION OF THE INVENTION

In one aspect, a method for predicting expected and unexpected loss outcomes for a portfolio of loans is provided. The method uses a computer system coupled to a database. The loans are issued by a lender to a plurality of borrowers. The method includes recording key account and risk attributes in the database for a historical portfolio of loans issued by the lender wherein the historical portfolio of loans includes loans issued to borrowers that have experienced a financial default with the lender and an associated economic loss, recording actual default and loss information in the database for each borrower included within the historical portfolio of loans, and comparing the key account and risk attributes with the actual default and loss information over a predetermined period of time. The method also includes selecting a sample of loans from the historical portfolio of loans to determine loss drivers based on the comparison of the key account and risk attributes with the actual default and loss information wherein the loss drivers include the key account and risk attributes predictive of a loss, building a regression tree based model representing relationships between the loss drivers, and expected and unexpected loss outcomes for the historical portfolio of loans, and predicting the expected and unexpected loss outcomes for a second portfolio of loans using the regression tree based model and the loss drivers for the second portfolio of loans wherein the second portfolio of loans includes borrowers that have not experienced a default with the lender.

In another aspect, a network-based system for predicting expected and unexpected loss outcomes for a portfolio of loans is provided. The loans are issued by a lender to a plurality of borrowers. The system includes a client system comprising a browser, a centralized database for storing information, and a server system configured to be coupled to the client system and the database. The server is further configured to record key account and risk attributes in the database for a historical portfolio of loans issued by the lender wherein the historical portfolio of loans includes loans issued to borrowers that have experienced a financial default with the lender and an associated economic loss, record actual default and loss information in the database for each borrower included within the historical portfolio of loans, compare the key account and risk attributes with the actual default and loss information over a predetermined period of time, and select a sample of loans from the historical portfolio of loans to determine loss drivers based on the comparison of the key account and risk attributes with the actual default and loss information wherein the loss drivers include the key account and risk attributes predictive of a loss. The server is further configured to build a regression tree based model representing relationships between the loss drivers, and expected and unexpected loss outcomes for the historical portfolio of loans, and predict the expected and unexpected loss outcomes for a second portfolio of loans using the regression tree based model and the loss drivers for the second portfolio of loans, wherein the second portfolio of loans includes borrowers that have not experienced a default with the lender.

In another aspect, a computer for predicting expected and unexpected loss outcomes for a portfolio of loans is provided. The loans are issued by a lender to a plurality of borrowers. The computer in communication with a database for storing information relating to each loan and each borrower. The computer is programmed to record key account and risk attributes in the database for a historical portfolio of loans issued by the lender wherein the historical portfolio of loans includes loans issued to borrowers that have experienced a financial default with the lender and an associated economic loss, record actual default and loss information in the database for each borrower included within the historical portfolio of loans, compare the key account and risk attributes with the actual default and loss information over a predetermined period of time, and select a sample of loans from the historical portfolio of loans to determine loss drivers based on the comparison of the key account and risk attributes with the actual default and loss information wherein the loss drivers include the key account and risk attributes predictive of a loss. The computer is further programmed to build a regression tree based model representing relationships between the loss drivers, and expected and unexpected loss outcomes for the historical portfolio of loans, and predict the expected and unexpected loss outcomes for a second portfolio of loans using the regression tree based model and the loss drivers for the second portfolio of loans wherein the second portfolio of loans includes borrowers that have not experienced a default with the lender.

In another aspect, a computer program embodied on a computer readable medium for predicting expected and unexpected loss outcomes for a portfolio of loans is provided. The loans are issued by a lender to a plurality of borrowers. The program includes at least one code segment that prompts a user to input key account and risk attributes for a historical portfolio of loans issued by the lender and then records the key account and risk attributes in a database wherein the historical portfolio of loans includes loans issued to borrowers that have experienced a financial default with the lender and an associated economic loss, records actual default and loss information in the database for each borrower included within the historical portfolio of loans, and compares the key account and risk attributes with the actual default and loss information over a predetermined period of time. The program also includes at least one code segment that selects a sample of loans from the historical portfolio of loans to determine loss drivers based on the comparison of the key account and risk attributes with the actual default and loss information wherein the loss drivers include the key account and risk attributes predictive of a loss, builds a regression tree based model representing relationships between the loss drivers and expected and unexpected loss outcomes for the historical portfolio of loans, and predicts the expected and unexpected loss outcomes for a second portfolio of loans using the regression tree based model and the loss drivers for the second portfolio of loans, the second portfolio of loans includes borrowers that have not experienced a default with the lender.

DETAILED DESCRIPTION OF THE INVENTION

Figure 1:
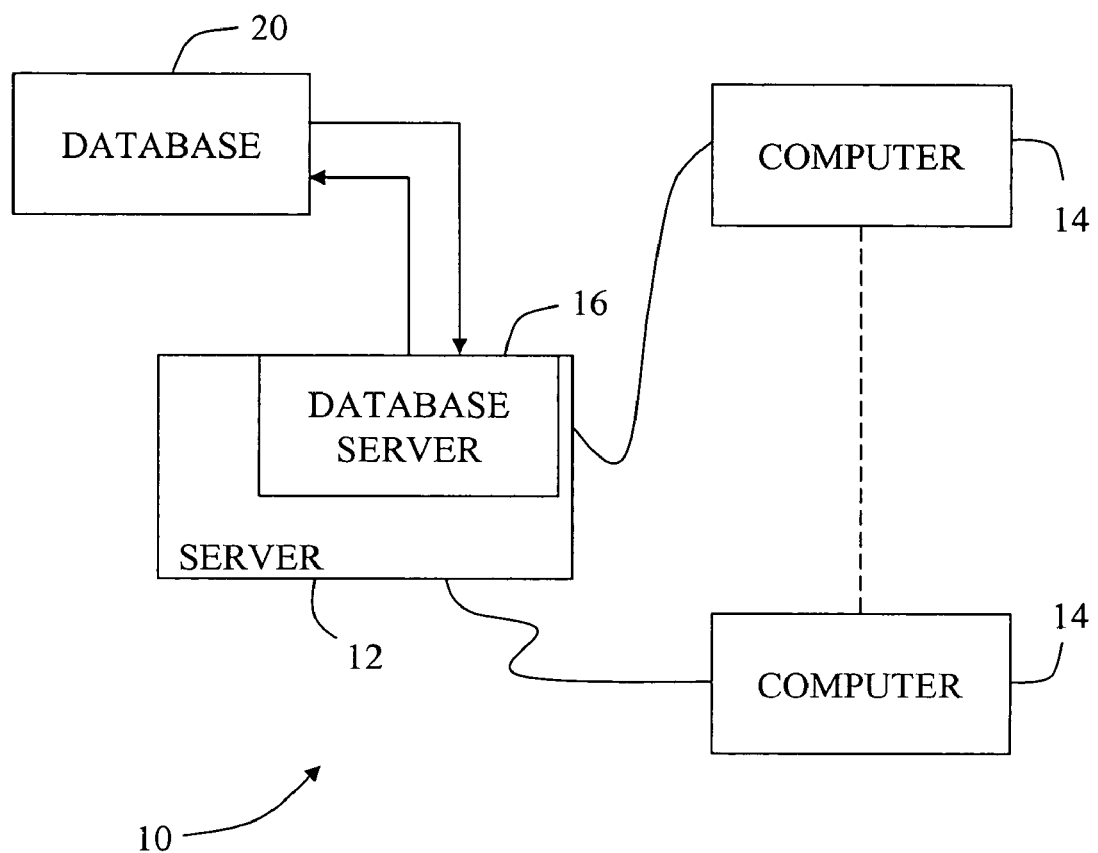
FIG. 1 is a simplified block diagram of an exemplary system in accordance with one embodiment of the present invention. The system is referred to as a Loss-Given-Default (LGD) system.

Described in detail below are exemplary embodiments of systems and processes that facilitate analyzing historical commercial loan performance data captured in a database, and using this data for business management advantage in deal structuring, pricing, acquisitions, account management and portfolio management. The systems and processes utilize models, for example regression-tree models, that identify loan segments of differentiated loss characteristics and loss severity, and predict or forecast loss amounts for non-defaulted accounts if such accounts were to default in the future. The systems and processes described herein enable a user, such as a commercial lender, to predict a Loss-Given-Default (LGD) for a portfolio of loans based on modeling generated from an analysis of historical commercial loan performance data.

The systems and processes facilitate, for example, electronic submission of information using a client system, automated extraction of information, and web-based reporting for internal and external system users. A technical effect of the systems and processes described herein include at least one of (a) recording measurements of key account and risk attributes in a computer system, (b) recording the variation in these key account and risk attributes for an historical portfolio of borrowers over time in the computer system, (c) consolidating account and risk measurements in a portfolio data repository, (d) associating key account and risk attributes with actual default and loss information (referred to as "performance data") in a longitudinal study (i.e., over time) for an historical portfolio of borrowers, (e) correlating predictive account and risk attributes (referred to as "loss drivers") with actual default and loss severity outcomes linked to historical borrowers and their loan obligations, (f) building regression-tree models which capture the relationships between loss drivers, and expected and unexpected loss for an historical portfolio of borrowers, (g) forecasting, using the regression-tree models, expected and unexpected loss severity outcomes for an active (e.g., current, new, or future) portfolio of borrowers if they were to default in the future based on their loss drivers, and (h) determining an appropriate level of economic capital required based on the amount of uncertainty in expected loss forecasts for the active portfolio of borrowers.

In the example embodiment, the forecasting of the expected and unexpected loss severity outcomes for an active portfolio of borrowers includes performing a Monte Carlo simulation analysis for the active portfolio of borrowers using the underlying model structures and assumptions made in performing the process. By using an iterative sampling technique, for example the Monte Carlo analysis, many expected and unexpected loss severity outcomes are simulated to produce a distribution of outcomes.

As a matter of background, claims of losses made against a commercial lender may have an impact on the lender's Economic Capital Allocation. A lender's Economic Capital Allocation relates to how a lender provides financing to satisfy the needs of a borrower (i.e., whether the lender provides financing from its own equity capital or from borrowing in the market). The allocation of equity versus debt is a function of how accurately a lender can predict the uncertainties associated with losses in their business. The methods and systems described herein facilitate the use of account, market, and process data to understand the drivers of absolute value and uncertainty causing: borrowers to default on their credit obligations, losses to mount once a default occurs, market valuations to change, and lending processes to break down.

Total Economic Capital may be defined to include Credit Risk Economic Capital, Market/Residual Risk Economic Capital, and Operational Risk Economic Capital. Each of these factors may influence whether a lender will make a profit or as much profit on each account as planned. The degree of difficulty in precisely predicting loss amounts impacts a rate of return for shareholders investing in the lender and creditors of the lender.

The systems and methods described herein are directed toward addressing the issue of Economic Capital Allocation for a commercial lender for which both expected (i.e., average predicted value) and unexpected losses (i.e., standard deviation of predicted value) are required to perform the calculation of Total Economic Capital.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® NT environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

As a matter of background, Loss-Given-Default (LGD) is defined as the economic loss incurred if a borrower or an obligor of the lender defaults. By predicting LGD, a lender may also calculate or predict the expected and unexpected loss outcomes for a loan. The expected loss is directly related to LGD. More specifically, the expected loss equals the probability of default (i.e., obligor rating) multiplied by the mean or average LGD, wherein the probability of default is separately derived. In other words, (EL %) equals (PD %)×(mean or average LGD %).

The unexpected loss is directly related to the standard deviation of LGD. More specifically, the unexpected loss (UL) is, in part, a function of the mean probability of default (PD), the standard deviation of PD, the mean LGD, and the standard deviation of LGD. LGD may be expressed as a percentage of an exposure amount at default. For example, an LGD=15% suggests that for each exposure unit at the time of default, only 85% of this amount will be recovered to pay down the existing loan or obligations.

FIG. 1 is a simplified block diagram of an exemplary system 10 in accordance with one embodiment of the present invention. System 10 includes a server system 12, and a plurality of client sub-systems, also referred to as client systems 14, connected to server system 12. System is referred to as a Loss-Given-Default (LGD) system. Computerized modeling and grouping tools, as described below in more detail, are stored in server 12 and can be accessed by a requester at any one of computers 14. In one embodiment, client systems 14 are computers including a web browser, such that server system 12 is accessible to client systems 14 using the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

Figure 2:
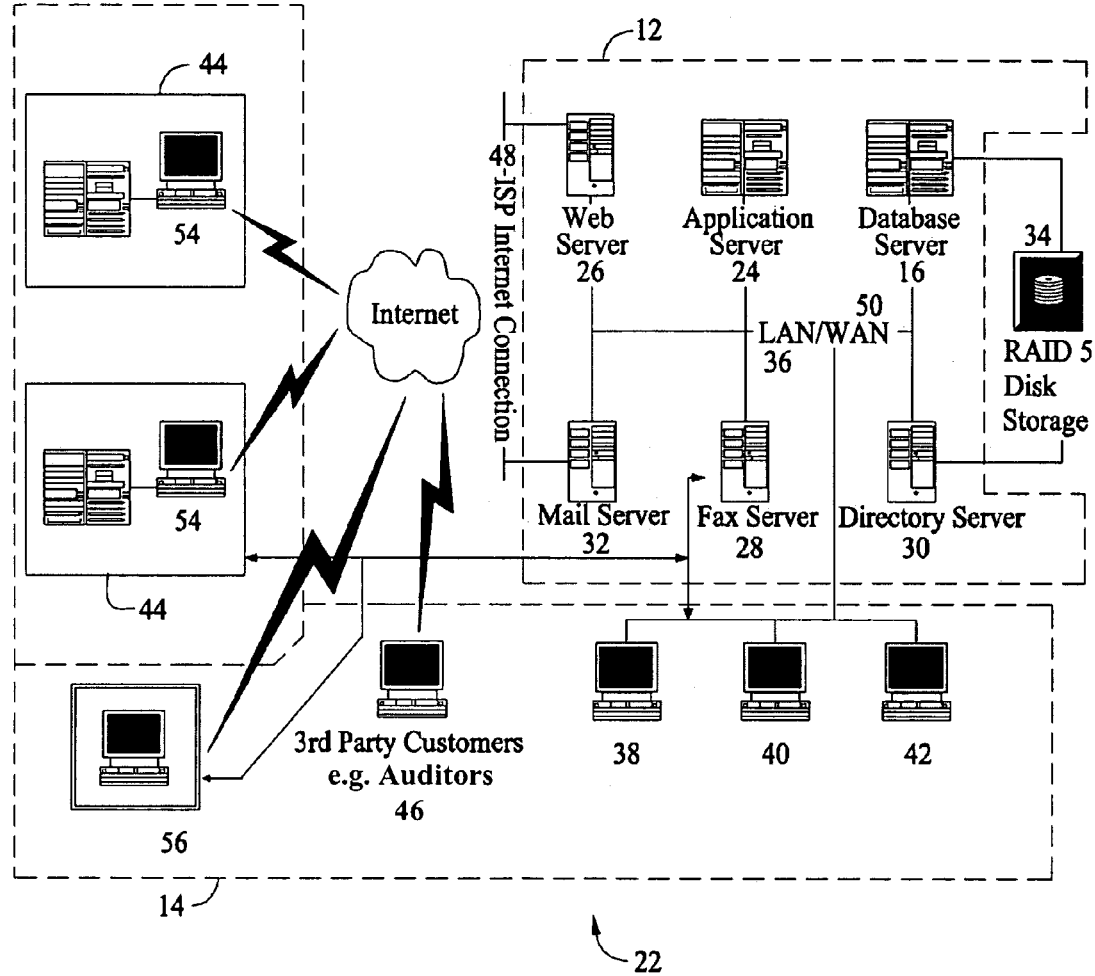
FIG. 2 is an expanded block diagram of an exemplary embodiment of a server architecture of a system in accordance with one embodiment of the present invention.

FIG. 2 is an expanded block diagram of an exemplary embodiment of a server architecture of a system 22 in accordance with one embodiment of the present invention. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 using an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties, e.g., auditors/customers, 46 using an ISP Internet connection 48. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 50, local area network 36 could be used in place of WAN 50.

In the exemplary embodiment, any authorized individual having a workstation 54 can access system 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a client system 56 using a telephone link. Fax server 28 is configured to communicate with other client systems 38, 40, and 42 as well.

Figure 3:
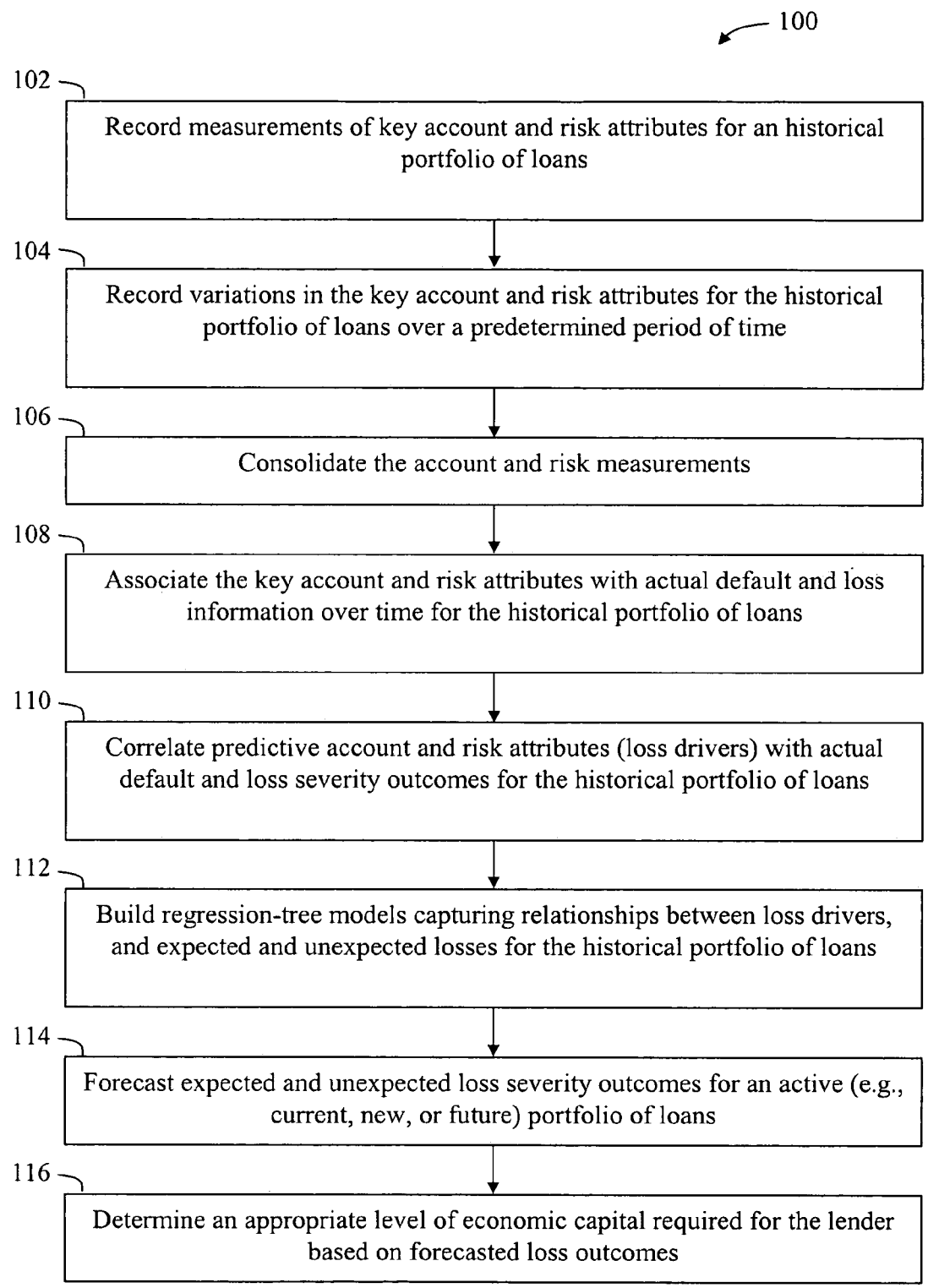
FIG. 3 is a flowchart illustrating exemplary processes utilized by the system shown in FIG. 1.

FIG. 3 is a flowchart 100 illustrating exemplary processes utilized by system 10 (shown in FIG. 1). In the example embodiment, system 10 may be utilized by a risk or finance manager associated with a commercial lender or any other type of lender making loans to a borrower. System 10 is utilized by the risk or finance manager to assess or predict losses on loans associated with the lender. The technical effect of the processes and systems described herein is achieved when the manager uses system 10 to record 102 measurements of key account and risk attributes in computer system 12 (shown in FIG. 1) for an historical portfolio of loans associated with the lender. The historical portfolio of loans includes loans issued to the borrowers that have experienced a financial default with the lender and an associated economic loss. System 10 also records 104 a variation in these key account and risk attributes for the historical portfolio of loans over a predetermined period of time in computer system 12, and consolidates 106 the account and risk measurements in database 20 (shown in FIG. 1).

System 10 stores actual default and loss information (referred to as "performance data") in database 20 for each borrower included within the historical portfolio of loans. The systems and processes described herein then associates 108 the key account and risk attributes with actual default and loss information in a longitudinal study (i.e., over time) for the historical portfolio of loans, and correlates 110 predictive account and risk attributes (referred to as "loss drivers") with actual default and loss severity outcomes linked to the historical borrowers and their loan obligations. Correlation 110 may include selecting a sample of loans from the historical portfolio of loans to determine loss drivers based on a comparison of the key account and risk attributes with the actual default and loss information wherein the loss drivers include the key account and risk attributes predictive of a loss.

System 10 builds 112 regression-tree based models which capture the relationships between the loss drivers, and expected and unexpected loss for the historical portfolio of loans. Using the regression-tree models built from the historical portfolio of loans, system 10 is able to forecast 114 expected and unexpected loss severity outcomes for an active (e.g., current, new, or future) portfolio of loans. The forecasting performed by system 10 assumes that the borrowers associated with the loans included within the active portfolio of loans were to default in the future, and is based on the loss drivers of the borrowers associated with the loans included within the active portfolio of loans. Based on this forecasting, system 10 is then able to determine 116 an appropriate level of economic capital required based on the expected and unexpected loss forecasts for the active portfolio of loans.

In the example embodiment, forecasting 114 of the expected and unexpected loss severity outcomes for the active portfolio of loans includes performing a Monte Carlo simulation analysis for the active portfolio of loans using the underlying model structures and assumptions made in performing the process on the historical portfolio of loans. By using an iterative sampling technique, for example the Monte Carlo analysis, many expected and unexpected loss severity outcomes are simulated to produce a distribution of outcomes.

The systems and processes described herein therefore identify loss drivers (i.e., drivers of expected and unexpected losses) by selecting a sample of loans from the historical portfolio of loans and comparing key account and risk attributes with actual default and loss information such that the loss drivers include the key account and risk attributes predictive of a loss. The process of identifying these loss drivers is performed in a relatively transparent manner. These loss drivers are then used to calculate and monitor Total Economic Capital for a lender having a plurality of loans issued to a plurality of borrowers. In the example embodiment, data mining processes are used to identify the attributes that are loss drivers. The loss drivers are then used as part of the building of the regression-tree based models. Once the relationships between the loss drivers and the expected and unexpected losses are established for the historical portfolio of loans, the simulation analysis (i.e., the Monte Carlo simulation analysis) may be performed to produce a distribution of expected and unexpected loss severity outcomes.

Figure 4:
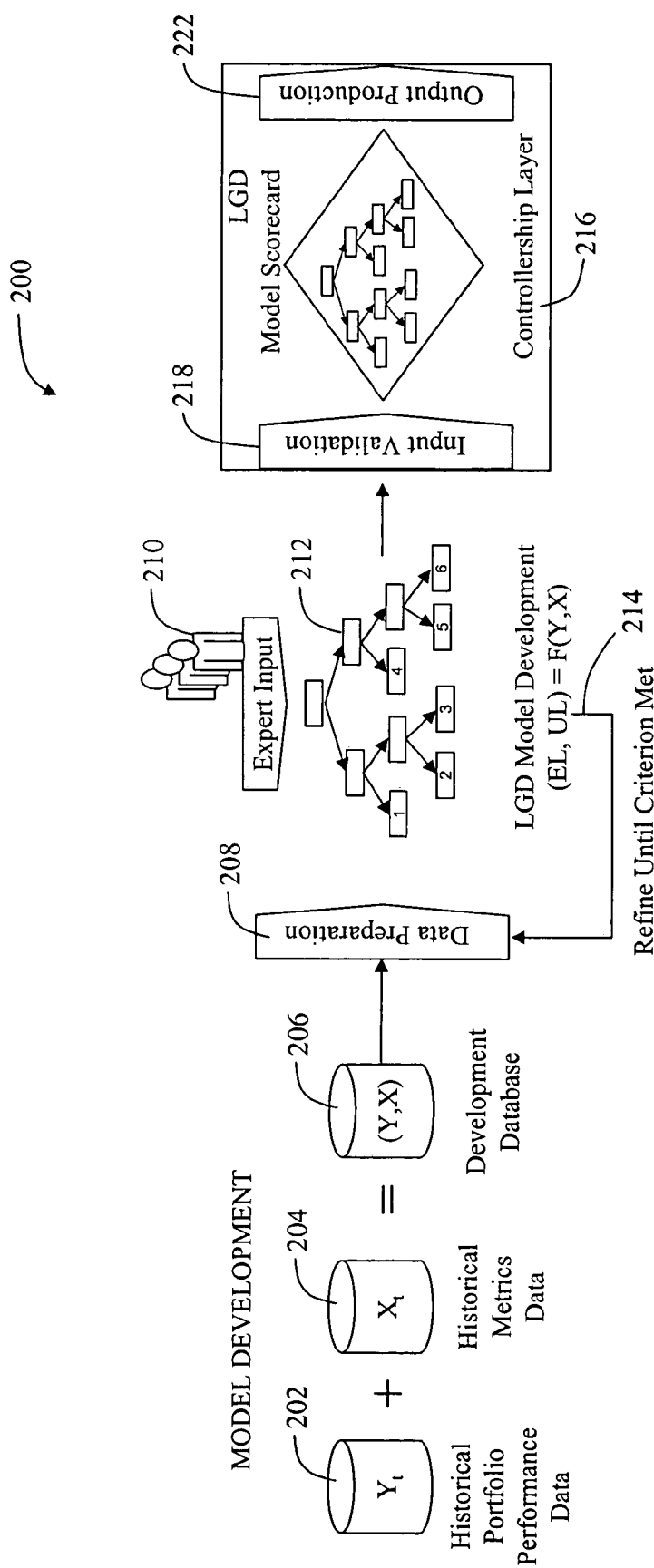
FIG. 4 is a more detailed flowchart illustrating exemplary processes utilized by the system shown in FIG. 1 relating to a development of a predictive model.

FIG. 4 is a more detailed flowchart 200 illustrating exemplary processes utilized by system 10 (shown in FIG. 1). Flowchart 200 illustrates a development of a predictive model from an historical portfolio of loans. After developing the predictive model, the model is used by the lender to predict future losses from loans included within a separate, active portfolio of loans.

The systems and processes described herein develop models for predicting future losses from loans by first recording 202 key financial performance measurements in database 20 (shown in FIG. 1). Database 20 is used to store information relating to borrowers originated within the lender's business that have experienced a financial default (e.g., missed payment, loan restructuring, or bankruptcy filing, etc.) and any associated economic loss experienced by the borrowers during their business relationship or "business life" as a customer of the lender.

The financial measurements recorded within database 20 are then analyzed by computer system 12 (shown in FIG. 1) for linking 204 with account and risk attribute data measured during a predetermined period of time preceding each default event (e.g., 6 or 12 months prior). The account and risk attributes typically include at least one of borrower variables, loan variables, industry variables and macro-economic variables. For example, the account and risk attributes may include, but are not limited to, the following financial and economic measures: sales and EBITDA (Earnings Before Interest, Taxes, Depreciation and Amortization), debt service coverage, liquidation coverage, senior debt multiple, capital stricture, company leverage, default likelihood, industry sector, exposure and credit line, and macro-economic factors including employment, interest rates, etc. Moreover, trends or other measures of variation in any of the above attributes may also be included within the analysis. These account and risk attributes (and their derivative trends/variations) are also known as key "leading indicators" of LGD (Loss-Given-Default).

System 10 stores 206 data including the key financial performance measurements, the account and risk attribute data, and the relationships between the data within database 20. This database is sometimes referred to as a model-development database. The model-development database may be a separate database or may be a section of a database within a single, centralized database.

From the model development database, a sample of records is selected 208 to identify appropriate transformation or encoding of all leading indicators. With appropriate input 210 from subject-matter experts, preliminary relationships between the leading indicators and the performance measure to be predicted in an LGD model (i.e., economic loss) are qualitatively identified.

The data stored within the model-development database is modeled 212 to produce a model for predicting expected and unexpected losses for an active portfolio of loans. In the example embodiment, the modeling technique used includes regression-tree analysis. Regression-tree modeling addresses the foundation of credit risk in the "downstream" economic capital calculation. The modeling technique divides the sample portfolio (i.e., the historical portfolio of loans) into "buckets" of differentiated expected (mean or average LGD) and unexpected (standard deviation of LGD) loss. Both of these statistical measures are used to calculate the economic capital for the active portfolio of loans, as well as in account and portfolio management.

In the example embodiment, in an effort to produce a model that will accurately predict future losses the steps of selecting 208 a sample of records, inputting 210 information from subject-matter experts, and modeling 212 to produce a model for predicting losses are repeated 214 until an acceptable (or maximized) level of predictive performance is achieved using the data not sampled in step 208. More specifically, in the example embodiment, a "hold-out sample" (i.e., a portion of the historical portfolio not used in step 208) is used to test the predictive power of the built regression-tree model. Accordingly, a model which can best explain or predict LGD for accounts not used in its development is typically the model selected to proceed with the analysis.

Once a final model is generated, the use of the model is controlled 216. Valid controllership on the usage of the generated model must be guaranteed. For example, only users with restricted access are given rights to apply the model to an active portfolio, or to undergo a model re-development plan in the event of model degradation (i.e., poor predictive performance post-development).

In the example embodiment, a "score production engine" included within system 10 is established in which the final model is applied to the active (or current) portfolio of loans. All inputs into the final model are validated 218 and transformed/encoded similar to the process implemented as part of step 208. The generated final model is applied 220 to the active portfolio of loans. Applying the model to the active portfolio of loans results in the forecasting of the expected (mean or average LGD) and unexpected (standard deviation of LGD) losses for accounts included within the active portfolio of loans. These particular loans are loans that have never experienced a default. These predicted values are then used to calculate 222 the economic capital for the active portfolio to be held on the lender's balance sheet, as well as for pricing, and account and portfolio management optimization.

Figure 5:
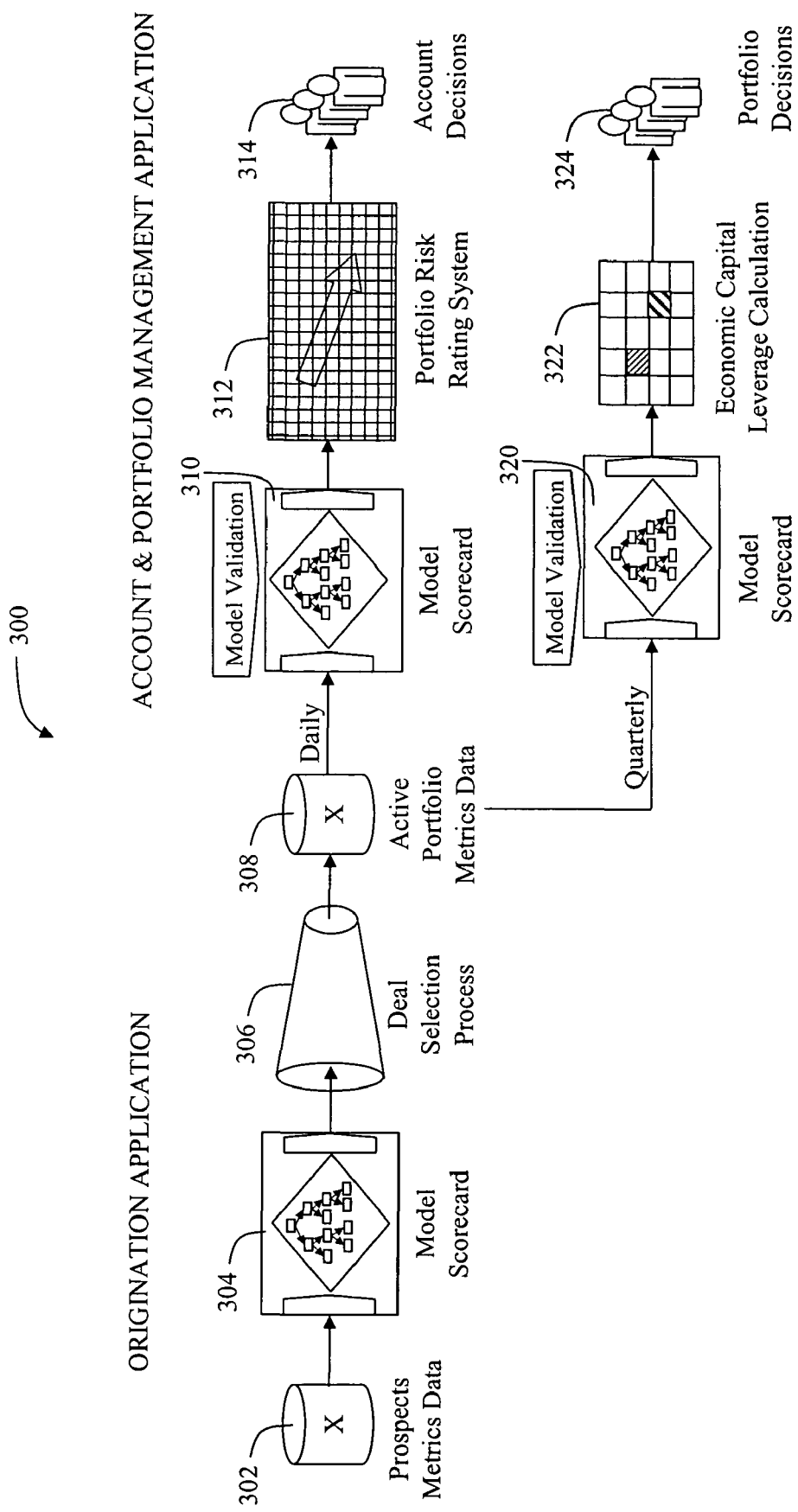
FIG. 5 is a flowchart illustrating exemplary processes utilized by the system shown in FIG. 1 relating to a deployment of a predictive model.

FIG. 5 is a flowchart 300 illustrating exemplary processes utilized by system 10 (shown in FIG. 1). Flowchart 300 illustrates a deployment of a predictive model for prospecting an active portfolio of loans. After developing a predictive model as shown in FIG. 4, the model is then used or deployed by the lender to predict future losses from loans included within a separate, active portfolio of loans. In the example embodiment, the loans included within the active portfolio have typically never experienced a default.

The systems and processes described herein include deploying the model resulting from steps described in FIG. 4. The forecasting of LGD for a borrower or loan is a critical piece of risk information that a lender may desire to utilize at account origination in the pricing process. In step 302, account and risk attribute data for prospective borrowers is collated in system database 20. In step 304, the model scorecard generated as part of step 220 (shown in FIG. 4) is used to calculate the forecasts for the loans being offered to the prospective clients. For the purposes of pricing the loans, this information aids in the calculation of an account's expected returns as a function of future transaction cash flows. Both the borrower and the lender may make use of this information as part of deal selection 306 process.

Once an account enters the active portfolio (i.e., is originated and funded), account and risk attribute data is stored 308 in a computer system. The account and risk attribute data is also kept up-to-date within the computer system. At this point, the systems and processes described herein may be used for: a) risk rating and account decisions, and b) economic capital and portfolio decisions.

With respect to risk rating and account decisions, the systems and processes described herein will forecast 310 the borrower's LGD using a developed model. The system will create a model scorecard for the borrowers. System 10 will then pair each borrower's forecasted LGD from the model scorecard with default likelihood information. The default likelihood information may be generated from an internal model built in a manner similar to FIG. 4, or from an external vendor's model applied to the active portfolio. A matrix grid is then produced 312 with dimensions PD (probability of default) by average LGD with each cell of the matrix identifying a PD×LGD combination for each account or loan, which is referred to the Total Expected Loss for each of the accounts. In the example embodiment, tiers of expected loss, in addition to other key attribute trends, are used to compartmentalize portfolio risk into a plurality of different groupings or risk ratings for the purpose of differentiated account management 314. For example, transactions with a very low Total Expected Loss will likely require less frequent monitoring or intervention as compared to a transaction with a higher value.

In the example embodiment, the systems and processes described herein include at least 10 different groupings or risk ratings which are used for differentiated or customized account management.

With respect to economic capital and portfolio decisions, the systems and processes described herein will forecast 320 the borrower's LGD using a developed model. The system will create a model scorecard for the borrowers. System 10 will then pair each borrower's forecasted LGD from the model scorecard with default likelihood information. System 10 then calculates 322 an amount of economic capital required on the lender's balance sheet for a loan transaction by performing a transaction-level "leverage" calculation.

Each loan included within the portfolio is associated with an amount of balance sheet capital. The lender then decides 324 how to manage the portfolio of loans based on the extent that the portfolio does or does not produce a sufficient return for the required amount of capital.

Figure 6:
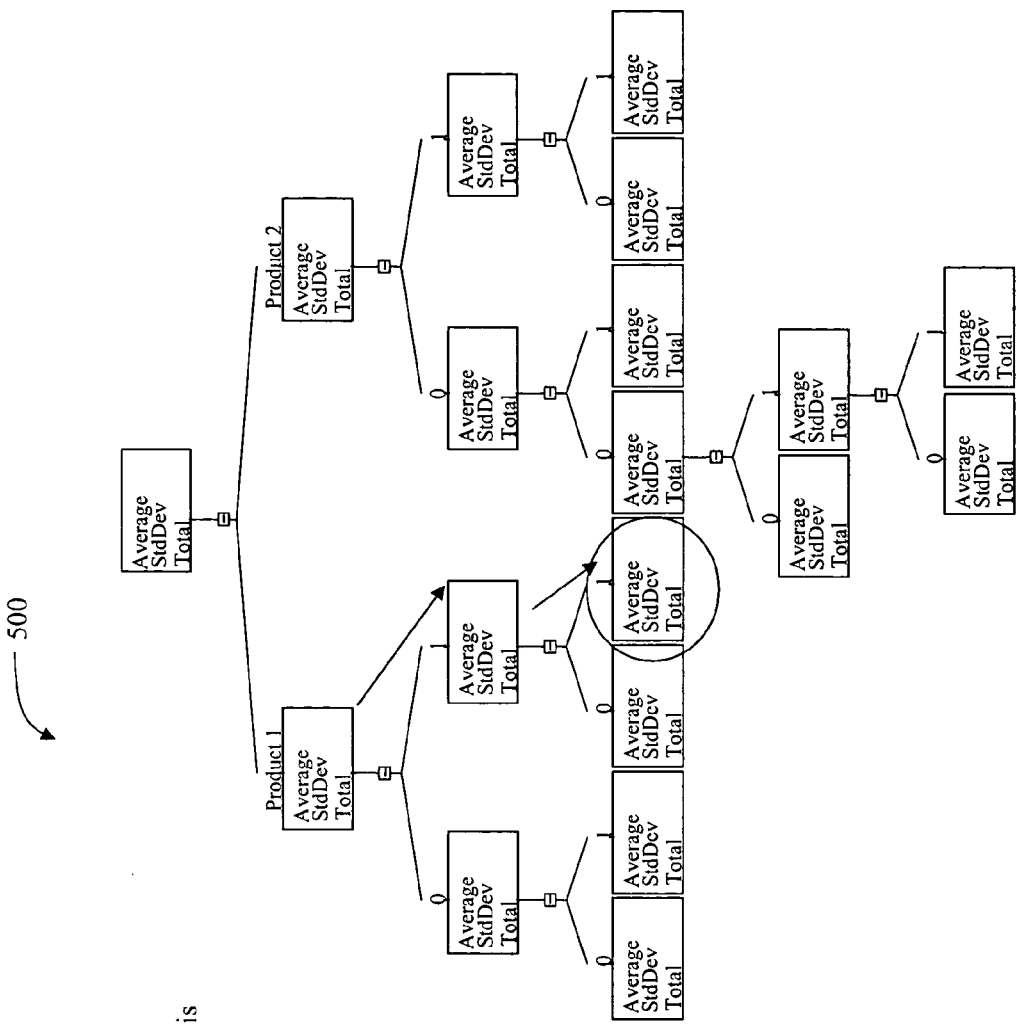
FIG. 6 is a diagram illustrating an expected loss computation using the system shown in FIG. 1.

FIG. 6 is a diagram 500 illustrating an expected loss computation using the system shown in FIG. 1. As discussed above, the expected loss equals the probability of default (i.e., obligor rating) multiplied by the mean or average LGD, wherein the probability of default is separately derived. The probability of default (PD) indicates a default frequency. The unexpected loss is directly related to the standard deviation of LGD. More specifically, the unexpected loss (UL) is, in part, a function of the mean probability of default (PD), the standard deviation of PD, the mean LGD, and the standard deviation of LGD. LGD may be expressed as a percentage of an exposure amount at default. For example, an LGD=15% suggests that for each exposure unit at the time of default, only 85% of this amount will be recovered to pay down the existing loan or obligations.

As stated above, a regression tree-based model is used for predicting expected and unexpected loss outcomes. The regression-tree modeling used by system 10 divides the sample portfolio (i.e., the historical portfolio of loans) into "buckets" of differentiated expected (mean or average LGD) and unexpected (standard deviation of LGD) loss. Both of these statistical measures are used calculating the economic capital for the active portfolio of loans, as well as in account and portfolio management.

If a portfolio's risk is understood better and is therefore less uncertain, then less equity is required to cover the uncertainty of the portfolio. Thus, the lender is able to "lever up" the proportion of debt to equity capital. Of course, with more debt on the lender's balance sheet, the more interest expense the lender will incur. Thus, in the short term, the lender's net income may decrease. However, the capital that is "released" (i.e., no longer required to hedge against losses) may be invested elsewhere at a better return. Thus, the lender's overall net income will increase. In addition, over the longer term, the lender should be able to increase its volume because of sharing enhanced returns with potential customers, namely not taking all of the leverage benefit, but sharing some of it with customers in terms of price.

Lenders that perform risk assessments at too high a level (e.g., at the entire portfolio level or at the product level) may not fully identify sources of variability or uncertainty, and therefore, the lender may unnecessarily ascribe that variability to the "unexplained". Unexplained variability typically produces a higher unexpected loss, which results in lower leverage and higher equity capital required. As mentioned above, the more equity capital that is required; the less capital is free to be invested for higher return.

The system described herein therefore enables a lender engaged in the business of issuing commercial loans to borrowers to analyze historical commercial loan performance data captured in a database, and use this data for a business management advantage in deal structuring, pricing, acquisitions, account management and portfolio management. More specifically, the system utilizes regression-tree models to identify loan segments of differentiated loss characteristics and loss severity, and predict or forecast loss amounts for non-defaulted accounts if such accounts were to default in the future. The system further enables a lender to calculate a Loss-Given-Default (LGD) for a portfolio of loans based on modeling generated from an analysis of historical commercial loan performance data.

More specifically, the system and process described herein enables a lender to: (a) record measurements of key account and risk attributes, (b) record the variation in these key account and risk attributes for an historical portfolio of borrowers over time, (c) consolidate account and risk measurements in a portfolio data repository, (d) associate key account and risk attributes with actual default and loss information (referred to as "performance data") in a longitudinal study (i.e., over time) for an historical portfolio of borrowers, (e) correlate predictive account and risk attributes (referred to as "loss drivers") with actual default and loss severity outcomes linked to historical borrowers and their loan obligations, (f) build regression-tree models which capture the relationships between loss drivers, and expected and unexpected loss for an historical portfolio of borrowers, (g) forecast, using the regression-tree models, expected and unexpected loss severity outcomes for an active (e.g., current, new, or future) portfolio of borrowers if they were to default in the future based on their loss drivers, and (h) determine an appropriate level of economic capital required based on the amount of uncertainty in expected loss forecasts for the active portfolio of borrowers.

While the invention has been described in terms of various specific embodiments, those skilled in the art will recognize that the invention can be practiced with modification within the spirit and scope of the claims.

What is claimed is:

1. A method for predicting expected and unexpected loss outcomes for a portfolio of loans using a computer system coupled to a database, the loans issued by a lender to a plurality of borrowers, said method comprising the steps of:
   recording key account and risk attributes in the database for a historical portfolio of loans issued by the lender, the historical portfolio of loans includes loans issued to borrowers that have experienced a financial default with the lender and an associated economic loss;
   recording actual default and loss information in the database for each borrower included within the historical portfolio of loans;
   comparing the key account and risk attributes with the actual default and loss information over a predetermined period of time, the comparison is performed by the computer system;
   dividing the historical portfolio of loans into a first sample of loans and a remaining hold-out sample of loans;
   selecting the first sample of loans from the historical portfolio of loans, the first sample of loans including the key account and risk attributes;
   determining loss drivers by using the computer system to electronically compare the key account and risk attributes of the first sample of loans with the actual default and loss information of the first sample of loans, the loss drivers being a set of the key account and risk attributes that are predictive of a loss;
   building, via the computer system, a regression tree based model representing relationships between the loss drivers, and expected and unexpected loss outcomes using the first sample of loans, the building of the regression tree based model includes dividing the first sample of loans into buckets of expected and unexpected loss outcomes based on the loss drivers, each bucket showing corresponding expected and unexpected loss outcomes relative to a change in at least one of the loss drivers;
   determining a final model by analyzing the remaining hold-out sample of loans with the regression tree based model and confirming the predictive accuracy of the final model, the final model representing a relationship between a set of loss drivers, and expected and unexpected loss outcomes; and
   predicting the expected and unexpected loss outcomes for a second portfolio of loans using the final model and the set of loss drivers for the second portfolio of loans, the second portfolio of loans includes borrowers that have not experienced a default with the lender, the prediction is performed by the computer system.

2. A method according to claim 1 wherein recording key account and risk attributes in the database for a historical portfolio of loans further comprises:
   recording variations in the key account and risk attributes in the database for the historical portfolio of loans over a predetermined period of time;
   comparing the key account and risk attributes, and the variations in the key account and risk attributes with the actual default and loss information over a predetermined period of time; and
   selecting the first sample of loans from the historical portfolio of loans to determine loss drivers based on the attributes and loss information comparison.

3. A method according to claim 1 wherein recording key account and risk attributes in the database for a historical portfolio of loans further comprises recording key account and risk attributes including at least one of the following financial measures for the corresponding borrower: sales and EBITDA (Earnings Before Interest, Taxes, Depreciation and Amortization), debt service coverage, liquidation coverage, senior debt multiple, capital structure, company leverage, default likelihood, industry sector, exposure and credit line, and macro-economic factors such as employment and interest rates.

4. A method according to claim 1 wherein predicting the expected and unexpected loss outcomes for a second portfolio of loans further comprises performing a Monte Carlo simulation analysis for the second portfolio of loans using model structures and assumptions made in building the regression tree based model from the determined loss drivers of the first sample of loans.

5. A method according to claim 1 wherein the expected loss outcome for each bucket is equal to a probability of default (PD) multiplied by a mean of a loss-given-default (mean LGD) for the bucket, and wherein the unexpected loss outcome for each bucket is a function of a mean of the PD, a standard deviation of the PD, the mean LGD, and a standard deviation of LGD for the bucket.

6. A method according to claim 1 wherein building a regression tree based model further comprises:
   building the regression tree based model based on the determined loss drivers of the first sample of loans;

maintaining the hold-out sample of loans from the historical portfolio of loans, the hold-out sample includes a portion of loans from the historical portfolio of loans not used in building the regression tree based model; and using the hold-out sample of loans to test predictive accuracy of the built regression tree based model.

7. A method according to claim 1 wherein predicting the expected and unexpected loss outcomes for a second portfolio of loans further comprises:

calculating an economic capital for the second portfolio of loans based on the predicted expected and unexpected loss outcomes;

recording the calculated economic capital on the balance sheet of the lender; and using the calculated economic capital for at least one of pricing potential future loans issued by the lender, and for account and portfolio management optimization by the lender.

8. A method according to claim 7 wherein using the calculated economic capital for at least one of pricing potential future loans issued by the lender further comprises calculating expected returns for each potential future loan as a function of future transaction cash flows.

9. A method according to claim 1 wherein predicting the expected and unexpected loss outcomes for a second portfolio of loans further comprises:

generating default likelihood data for each borrower included within the second portfolio of loans;

combining the predicted expected and unexpected loss outcomes for each borrower included with the second portfolio of loans with the corresponding default likelihood data; and generating a matrix having dimensions for each borrower that include a probability of default (PD) by a mean loss-given-default (mean LGD).

10. A network-based system for predicting expected and unexpected loss outcomes for a portfolio of loans issued by a lender to a plurality of borrowers, said system comprising:

a client system comprising a browser;

a centralized database for storing information; and a server system configured to be coupled to said client system and said database, said server further configured to:

record key account and risk attributes in the database for a historical portfolio of loans issued by the lender, the historical portfolio of loans includes loans issued to borrowers that have experienced a financial default with the lender and an associated economic loss, record actual default and loss information in the database for each borrower included within the historical portfolio of loans, compare the key account and risk attributes with the actual default and loss information over a predetermined period of time, divide the historical portfolio of loans into a first sample of loans and a remaining hold-out sample of loans, select the first sample of loans from the historical portfolio of loans, the first sample of loans including the key account and risk attributes, determining loss drivers by comparing the key account and risk attributes of the first sample of loans with the actual default and loss information of the first sample of loans, the loss drivers being a set of the key account and risk attributes that are predictive of a loss, build a regression tree based model representing relationships between the loss drivers, and expected and unexpected loss outcomes using the first sample of loans, the building of the regressing tree based model includes dividing the first sample of loans into buckets of expected and unexpected loss outcomes based on the loss drivers, each bucket showing corresponding expected and unexpected loss outcomes relative to a change in at least one of the loss drivers, determine a final model by analyzing the remaining hold-out sample of loans with the regression tree based model and confirm the predictive accuracy of the final model, the final model representing a relationship between a set of loss drivers, and expected and unexpected loss outcomes, and predict the expected and unexpected loss outcomes for a second portfolio of loans using the final model and the set of loss drivers for the second portfolio of loans, the second portfolio of loans includes borrowers that have not experienced a default with the lender.

11. A system according to claim 10 wherein said server system further configured to:

record variations in the key account and risk attributes in the database for the historical portfolio of loans over a predetermined period of time, compare the key account and risk attributes, and the variations in the key account and risk attributes with the actual default and loss information over a predetermined period of time, and select the first sample of loans from the historical portfolio of loans to determine loss drivers based on the attributes and loss information comparison.

12. A system according to claim 10 wherein the key account and risk attributes comprise at least one of the following financial measures for the corresponding borrower: sales and EBITDA (Earnings Before Interest, Taxes, Depreciation and Amortization), debt service coverage, liquidation coverage, senior debt multiple, capital structure, company leverage, default likelihood, industry sector, exposure and credit line, and macro-economic factors such as employment and interest rates.

13. A system according to claim 10 wherein said server system further configured to perform a Monte Carlo simulation analysis for the second portfolio of loans using model structures and assumptions made in building the regression tree based model from the determined loss drivers of the first sample of loans, the simulation analysis is used for predicting the expected and unexpected loss outcomes for the second portfolio of loans.

14. A system according to claim 10 wherein the expected loss outcome for each bucket is equal to a probability of default (PD) multiplied by a mean of a loss-given-default (mean LGD) for the bucket, and wherein the unexpected loss outcome for each bucket is a function of a mean of the PD, a standard deviation of the PD, the mean LGD, and a standard deviation of LGD for the bucket.

15. A system according to claim 10 wherein said server system further configured to:

build the regression tree based model based on the determined loss drivers of the first sample of loans, maintain the hold-out sample of loans from the historical portfolio of loans, the hold-out sample includes a portion of loans from the historical portfolio of loans not used in building the regression tree based model, and using the hold-out sample of loans to test predictive accuracy of the built regression tree based model.

16. A system according to claim 10 wherein said server system further configured to:
- calculate an economic capital for the second portfolio of loans based on the predicted expected and unexpected loss outcomes,
- record the calculated economic capital on the balance sheet of the lender, and
- use the calculated economic capital for at least one of pricing potential future loans issued by the lender, and for account and portfolio management optimization by the lender.

17. A system according to claim 16 wherein said server system further configured to calculate expected returns for each potential future loan as a function of future transaction cash flows.

18. A system according to claim 10 wherein said server system further configured to:
- generate default likelihood data for each borrower included within the second portfolio of loans,
- combine the predicted expected and unexpected loss outcomes for each borrower included with the second portfolio of loans with the corresponding default likelihood data, and
- generate a matrix having dimensions for each borrower that include a probability of default (PD) by a mean loss-given-default (mean LGD).

19. A computer for predicting expected and unexpected loss outcomes for a portfolio of loans issued by a lender to a plurality of borrowers, said computer in communication with a database for storing information relating to each loan and each borrower, said computer programmed with instructions stored on a computer readable medium, the instructions, when executed, direct the computer to:
- record key account and risk attributes in the database for a historical portfolio of loans issued by the lender, the historical portfolio of loans includes loans issued to borrowers that have experienced a financial default with the lender and an associated economic loss;
- record actual default and loss information in the database for each borrower included within the historical portfolio of loans;
- compare the key account and risk attributes with the actual default and loss information over a predetermined period of time;
- divide the historical portfolio of loans into a first sample of loans and a remaining hold-out sample of loans;
- select the first sample of loans from the historical portfolio of loans, the first sample of loans including the key account and risk attributes;
- determining loss drivers by comparing the key account and risk attributes of the first sample of loans with the actual default and loss information of the first sample of loans, the loss drivers being a set of the key account and risk attributes that are predictive of a loss;
- build a regression tree based model representing relationships between the loss drivers, and expected and unexpected loss outcomes using the first sample of loans, the building of the regression tree based model includes dividing the first sample of loans into buckets of expected and unexpected loss outcomes based on the loss drivers, each bucket showing corresponding expected and unexpected loss outcomes relative to a change in at least one of the loss drivers;
- determine a final model by analyzing the remaining hold-out sample of loans with the regression tree based model and confirm the predictive accuracy of the final model, the final model representing a relationship between a set of loss drivers, and expected and unexpected loss outcomes; and
- predict the expected and unexpected loss outcomes for a second portfolio of loans using the final model and the set of loss drivers for the second portfolio of loans, the second portfolio of loans includes borrowers that have not experienced a default with the lender.

20. A computer according to claim 19 wherein said computer is further programmed to:
- record variations in the key account and risk attributes in the database for the historical portfolio of loans over a predetermined period of time;
- compare the key account and risk attributes, and the variations in the key account and risk attributes with the actual default and loss information over a predetermined period of time; and
- select the first sample of loans from the historical portfolio of loans to determine loss drivers based on the attributes and loss information comparison.

21. A computer according to claim 19 wherein said computer is further programmed to perform a Monte Carlo simulation analysis for the second portfolio of loans using model structures and assumptions made in building the regression tree based model from the determined loss drivers of the first sample of loans, the simulation analysis is used for predicting the expected and unexpected loss outcomes for the second portfolio of loans.

22. A computer according to claim 19 wherein the expected loss outcome for each bucket is equal to a probability of default (PD) multiplied by a mean of a loss-given-default (mean LGD) for the bucket, and wherein the unexpected loss outcome for each bucket is a function of a mean of the PD, a standard deviation of the PD, the mean LGD, and a standard deviation of LGD for the bucket.

23. A computer according to claim 19 wherein said computer is further programmed to:
- calculate an economic capital for the second portfolio of loans based on the predicted expected and unexpected loss outcomes;
- record the calculated economic capital on the balance sheet of the lender; and
- use the calculated economic capital for at least one of pricing potential future loans issued by the lender, and for account and portfolio management optimization by the lender.

24. A computer according to claim 19 wherein said computer is further programmed to:
- generate default likelihood data for each borrower included within the second portfolio of loans;
- combine the predicted expected and unexpected loss outcomes for each borrower included with the second portfolio of loans with the corresponding default likelihood data; and
- generate a matrix having dimensions for each borrower that include a probability of default (PD) by a mean loss-given-default (mean LGD).

25. A computer program embodied on a non-transitory computer readable medium for predicting expected and unexpected loss outcomes for a portfolio of loans issued by a lender to a plurality of borrowers, said program comprising at least one code segment that, when executed, prompts a user to input key account and risk attributes for a historical portfolio of loans issued by the lender and then:
- records the key account and risk attributes in a database, the historical portfolio of loans includes loans issued to borrowers that have experienced a financial default with the lender and an associated economic loss;

records actual default and loss information in the database for each borrower included within the historical portfolio of loans;

compares the key account and risk attributes with the actual default and loss information over a predetermined period of time;

divides the historical portfolio of loans into a first sample of loans and a remaining hold-out sample of loans;

selects the first sample of loans from the historical portfolio of loans, the first sample of loans including the key account and risk attributes;

determines loss drivers by comparing the key account and risk attributes of the first sample of loans with the actual default and loss information of the first sample of loans, the loss drivers being a set of the key account and risk attributes that are predictive of a loss;

builds a regression tree based model representing relationships between the loss drivers, and expected and unexpected loss outcomes using the first sample of loans, the building of the regression tree based model includes dividing the first sample of loans into buckets of expected and unexpected loss outcomes based on the loss drivers, each bucket showing corresponding expected and unexpected loss outcomes relative to a change in at least one of the loss drivers;

determines a final model by analyzing the remaining hold-out sample of loans with the regression tree based model and confirms the predictive accuracy of the final model, the final model representing a relationship between a set of loss drivers, and expected and unexpected loss outcomes; and predicts the expected and unexpected loss outcomes for a second portfolio of loans using the final model and the set of loss drivers for the second portfolio of loans, the second portfolio of loans includes borrowers that have not experienced a default with the lender.

26. A computer program in accordance with claim 25 further comprising at least one code segment that:

records variations in the key account and risk attributes in the database for the historical portfolio of loans over a predetermined period of time;

compares the key account and risk attributes, and the variations in the key account and risk attributes with the actual default and loss information over a predetermined period of time; and selects the first sample of loans from the historical portfolio of loans to determine loss drivers based on the attributes and loss information comparison.

27. A computer program in accordance with claim 25 further comprising at least one code segment that performs a Monte Carlo simulation analysis for the second portfolio of loans using model structures and assumptions made in building the regression tree based model from the determined loss drivers of the first sample of loans, the simulation analysis is used for predicting the expected and unexpected loss outcomes for the second portfolio of loans.

28. A computer program in accordance with claim 25 wherein the expected loss outcome for each bucket is equal to a probability of default (PD) multiplied by a mean of a loss-given-default (mean LGD) for the bucket, and wherein the unexpected loss outcome for each bucket is a function of a mean of the PD, a standard deviation of the PD, the mean LGD, and a standard deviation of LGD for the bucket.

29. A computer program in accordance with claim 25 further comprising at least one code segment that:

calculates an economic capital for the second portfolio of loans based on the predicted expected and unexpected loss outcomes;

records the calculated economic capital on the balance sheet of the lender; and uses the calculated economic capital for at least one of pricing potential future loans issued by the lender, and for account and portfolio management optimization by the lender.

30. A computer program in accordance with claim 25 further comprising at least one code segment that:

generates default likelihood data for each borrower included within the second portfolio of loans;

combines the predicted expected and unexpected loss outcomes for each borrower included with the second portfolio of loans with the corresponding default likelihood data; and generates a matrix having dimensions for each borrower that include a probability of default (PD) by a mean loss-given-default (mean LGD).

* * * * *